(12) United States Patent
Ku

(10) Patent No.: US 7,264,349 B1
(45) Date of Patent: Sep. 4, 2007

(54) QUICK-RELEASE EYEGLASSES HINGE

(75) Inventor: Otis Ku, Kowloon (CN)

(73) Assignee: Sun Hing Optical Manufactory Limited, Kowloon, Hong Kong (CN)

( * ) Notice: Subject to any disclaimer, the term of this patent is extended or adjusted under 35 U.S.C. 154(b) by 0 days.

(21) Appl. No.: 11/634,291

(22) Filed: Dec. 4, 2006

(30) Foreign Application Priority Data

Aug. 1, 2006 (HK) ............................... 06108541.1

(51) Int. Cl.
*G02C 5/22* (2006.01)
(52) U.S. Cl. ..................... 351/153; 351/116; 351/120; 16/228
(58) Field of Classification Search ............... 351/153, 351/116, 120, 111, 118, 119, 140, 41; 16/228
See application file for complete search history.

(56) References Cited

U.S. PATENT DOCUMENTS

| 4,084,889 A | * | 4/1978 | Vischer, Jr. ................. 351/121 |
| 5,583,588 A |   | 12/1996 | Chao |
| 5,791,015 A |   | 8/1998 | Wandinger |
| 5,971,539 A | * | 10/1999 | Kobayashi .................. 351/153 |
| 6,050,686 A | * | 4/2000 | De Rossi ..................... 351/153 |
| 6,575,570 B2 |  | 6/2003 | Mauri |

FOREIGN PATENT DOCUMENTS

| CN | 2 763 829 Y | 3/2006 |
| FR | 2 658 231 A | 8/1991 |

* cited by examiner

*Primary Examiner*—Hung Xuan Dang
(74) *Attorney, Agent, or Firm*—Alix, Yale & Ristas, LLP

(57) ABSTRACT

A hinge for eyeglasses includes a hinge block for attachment to a lens frame of the eyeglasses. The hinge block has an aperture and a slot extending from the aperture. A hinge pin is attached to an arm of the eyeglasses. The hinge pin is pivotally received by the aperture and has a radially extending leg that is sized and shaped to pass within the slot upon attachment of the hinge pin to the hinge block to enable quick release when desired.

9 Claims, 4 Drawing Sheets

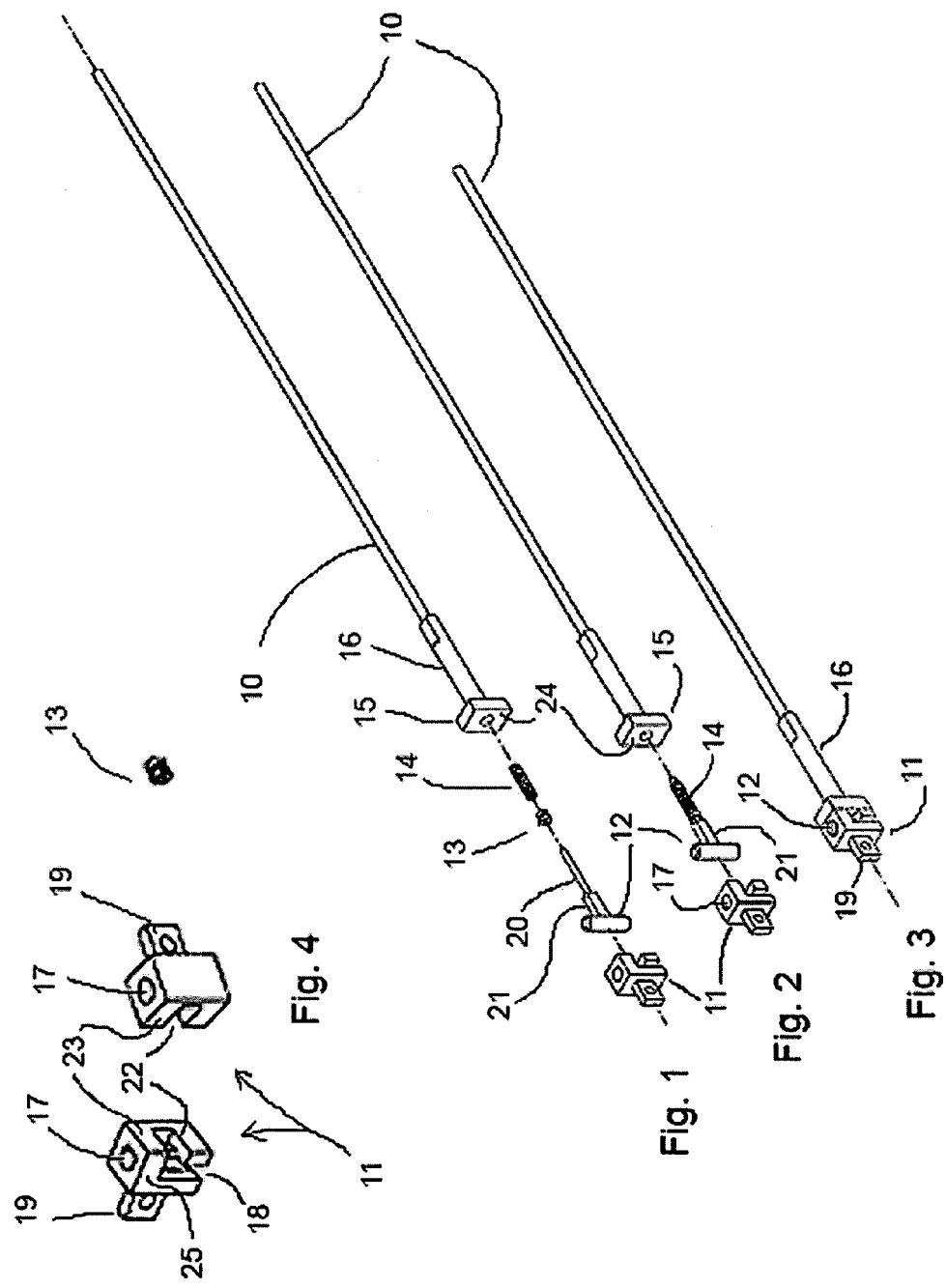

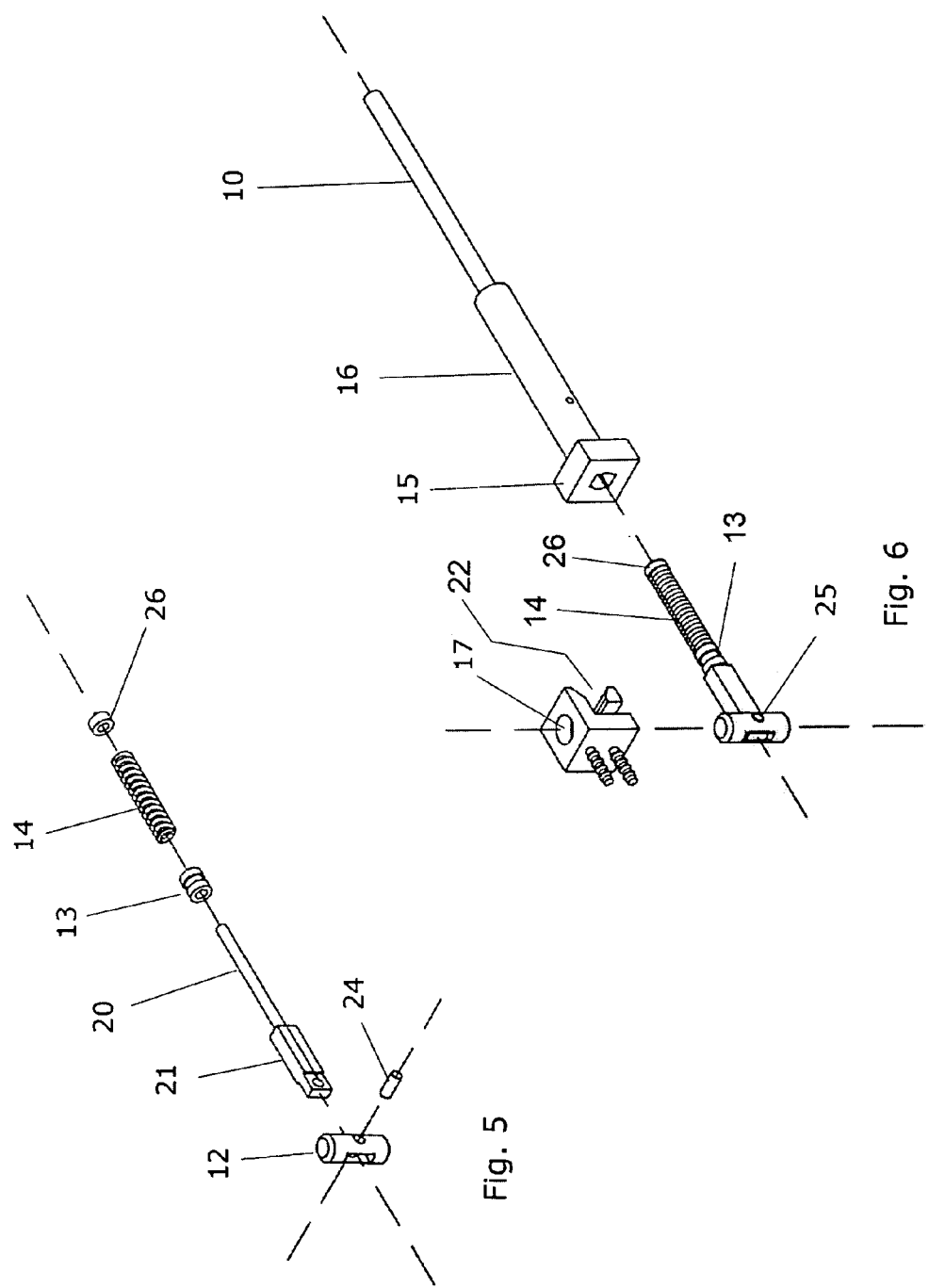

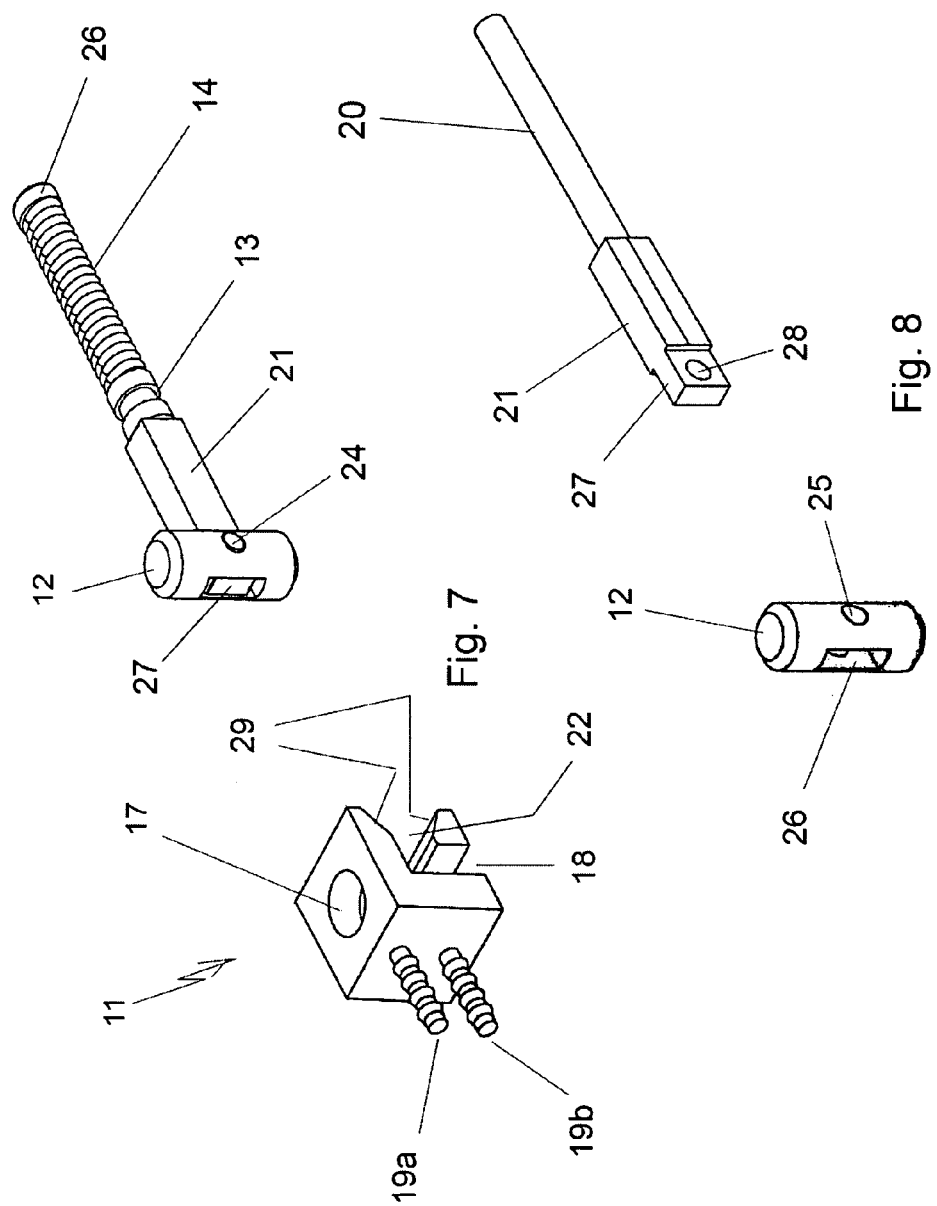

QUICK-RELEASE EYEGLASSES HINGE

BACKGROUND OF THE INVENTION

The present invention relates to eyeglasses. More particularly, although not exclusively, the invention relates to a quick-release hinge for eyeglasses.

Typical known eyeglasses comprise a lens frame connected to each of a pair of earpieces by a hinge. Each hinge typically comprises a screw passing through aligned apertures, one of which is threaded to receive the thread of the screw. The screw defines the pivot axis of the hinge. In order to remove the earpieces it is necessary to use a small screwdriver to remove the screw from each hinge. A further problem exists in that the screws can become loose over time and become inadvertently dislodged and misplaced.

Also known eyeglasses do not enable the wearer to adjust the angle of the lens/lens frame up and down with respect to the arms for comfort.

OBJECTS OF THE INVENTION

It is an object of the present invention to overcome or substantially ameliorate at least one of the above disadvantages and/or more generally to provide an improved quick-release eyeglasses hinge.

DISCLOSURE OF THE INVENTION

There is disclosed herein a hinge for eyeglasses, comprising:
a hinge block for attachment to or formed integrally with a first part of the eyeglasses, the hinge block comprising a hinge block aperture and a slot extending from the hinge block aperture,
a hinge pin attached to a second part of the eyeglasses, the hinge pin having a first axis and being receivable in the hinge block aperture so as to pivot about said first axis and having a leg extending radially therefrom, the leg being sized and shaped to pass within the slot upon said attachment and detachment, the hinge pin further comprising a transverse hole, the leg also comprising a transverse hole aligned with the transverse hole of the hinge pin, the hinge further comprising a transverse pin extending through the aligned transverse holes to allow pivotal movement of the leg with respect to the hinge pin about a second access normal to said first axis.

Preferably, the slot comprises a first segment extending parallel to the hinge block aperture and through which the leg passes during attachment to and detachment of the hinge pin to the hinge block, and a second segment extending normal to the hinge block aperture and within which the leg pivots in use.

Preferably, the hinge block further comprises a connection tab extending therefrom and by which the hinge block can be attached to the first part of the eyeglasses.

Preferably, the leg comprises a spring post having a coil spring located thereabout and wherein the second part of the eyeglasses comprises an elongate arm having a spring cylinder therein for receiving the spring post and the spring.

Preferably, the hinge further comprises a washer attaching one end of the coil spring to the leg, and wherein the other end of the spring is attached to the elongate arm.

Preferably, the hinge block comprises a bearing face at least partially across which the second segment of the slot extends and wherein the spring cylinder comprises a buffer plate which bears against the bearing face under action of the coil spring.

Preferably, the bearing face and buffer plate are substantially flat.

Preferably, the second segment of the hinge block slot comprises tapered surfaces against which the leg can bear to define the maximum pivotal extent of the arm with respect to the hinge block.

There is further disclosed herein eyeglasses comprising the above-disclosed hinge wherein a lens and/or lens frame of the eyeglasses constitute said first part and wherein an arm of the eyeglasses constitute said second part.

BRIEF DESCRIPTION OF THE DRAWINGS

Preferred forms of the present invention will now be described by way of example with reference to the accompanying drawings, wherein:

FIG. 1 is a schematic parts-exploded perspective illustration of a first hinge and an arm for eyeglasses, FIG. 2 is another schematic parts-exploded perspective illustration of the hinge and arm of FIG. 1 in a partially assembled configuration, FIG. 3 is another schematic perspective illustration of the assembled hinge and arm of FIGS. 1 and 2, FIG. 4 comprises schematic front and back perspective illustrations of a hinge block forming part of the hinge depicted in FIGS. 1 to 3, and a washer that is also shown in FIG. 1, FIG. 5 is a schematic parts-exploded perspective illustration of parts of a second hinge and arm, FIG. 6 is a schematic parts-partially exploded perspective illustration of those parts shown in FIG. 5, FIG. 7 is a schematic perspective illustration of the assembled parts of FIGS. 5 and 6 and its associated hinge block, FIG. 8 is a schematic parts partially-exploded perspective illustration of the hinge pin and adjoining parts.

DESCRIPTION OF THE PREFERRED EMBODIMENTS

Figure 9:
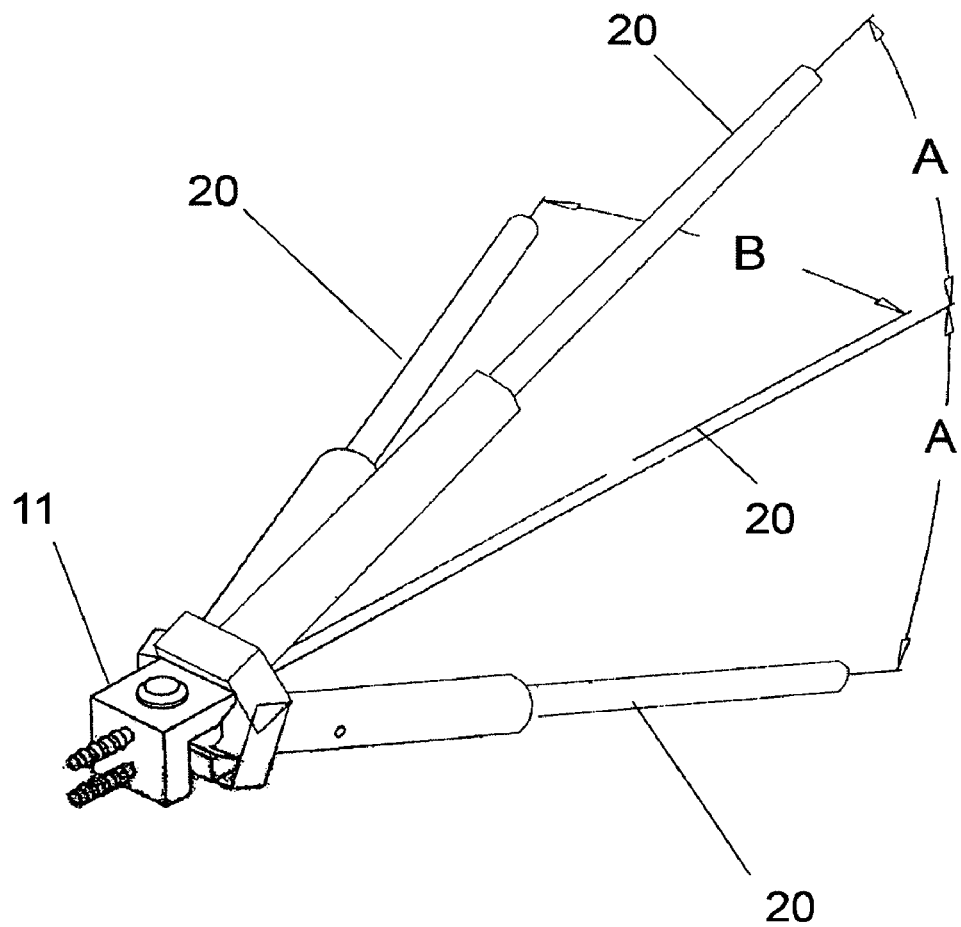
FIG. 9 is a schematic perspective illustration of the hinge and arm of FIGS. 5 to 8 showing double degrees of pivotal movement of the arm.

In FIGS. 1 to 4 of the accompanying drawings there is depicted schematically a metal reinforcing arm 10 of a pair of eyeglasses. This arm would typically be coated in plastics material for style and/or comfortable fitting over the ear of a wearer in use. The arm would typically comprise a bent down section at its distal end, but the plastics coating is not shown. At the proximal end of the reinforcing arm 10, there is provided a screw-fitted spring cylinder 16 which is typically fabricated in metal. The spring cylinder comprises a pair of flats against which a tool can grip for turning the spring cylinder onto an externally threaded end portion of the reinforcing arm 10.

At the forward end of the spring cylinder 16, there is provided a buffer plate 15 having a forward-facing flat surface 24. There is an opening in the centre of the flat surface 24 as shown.

A hinge block 11, as best depicted in FIG. 4, is also typically fabricated from metal and comprises a hinge block aperture 17 in its top surface. The hinge block aperture is circular in cross-section and extends vertically down into the hinge block. Located beneath the hinge block aperture and open thereto is a slot. The slot comprises a first segment 18 which extends in a direction parallel to the vertical extent of the hinge block aperture 17. There is a second segment 22 of the slot which extends normally to the first segment and transversely across the hinge block aperture 17. A connection tab 19 extends away from the second slot segment 22 and comprises a transverse aperture. The connection tab 19 serves as a means by which the hinge block can be connected to a lens frame of the eyeglasses (not shown). To this end, a screw might pass through the aperture of the tab 19, or the lens frame, if moulded in plastics material, can simply extend into the aperture.

A cylindrical hinge pin 12 is sized and shaped to be received pivotally within the hinge block aperture 17 of the hinge block 11. A leg 21 extends radially of the pin 12. Upon insertion of the pin 12 to the hinge block aperture 17, the leg 21 passes upwardly through the first slot segment 18 until it is aligned with the second slot segment 22. Upon pivoting of the pin 12, the leg 21 extends through the second slot segment 22. The leg 21 is sized and shaped to enable fitting movement along the slot segment 22 as the pin 12 pivots within the hinge block aperture 17.

Extending from the leg 21 is a spring post 20. A coil spring 14 is fitted over the spring post 20 and a tight washer 13 secures one end of the spring to the spring post 20. The spring post 20 and spring 14 are inserted into the aperture of the flat surface 24 of the buffer plate 15 and are received within the spring cylinder 16. An end of the spring 14 can be received upon the threaded end of the reinforcing arm 10. The spring 14 is intended to extend upon pivotal movement of the pin 12 within the hinge block 11. To enable this, the hinge block 11 comprises a flat bearing surface 23 that bears against the flat surface 24 of the buffer plate 15. When pivoting occurs, the vertical edges of the abutting surfaces mutually engage so that the middle portions of the plates lift away from one another as the pin 12 is drawn outwardly by the hinge block against the spring 14. Moreover, interaction of the spring 14 and flat bearing surfaces provides a centering effect so that the reinforcing arm 10 extends substantially at right angles with respect to the lens frame for wearing of the eyeglasses. Furthermore, when the reinforcing arm is pivoted throughout 90 degrees to a folded position, a second bearing surface 25 of the hinge block 11 bears against the flat surface 24 of the buffer plate 15 to thereby retain the reinforcing arm 10 in the closed position. In this closed position, the arm can be quickly released from the lens frame by sliding the pin 12 downward such that the leg 21 passes through the first slot segment 18 on exit therefrom.

The hinge of the above embodiment provides a single degree of freedom of pivotal movement of the arm.

FIGS. 5 to 9 of the accompanying drawings depict a second embodiment of the invention in which two degrees of freedom of pivotal movement are provided. To this end, the hinge block 11 and hinge pin 12 a slightly modified.

The hinge pin 12 comprises a transverse horizontal pinhole 25. The hinge pin 12 also includes a vertical slot 26. The spring cylinder 21 includes a pivot flange 27 which is received within the vertical slot 26 and which includes a transverse pinhole 28. A pivot pin 24 extends through the aligned pinholes 25 and 28 to locate the pivot flange 27 within the vertical slot 26 to enable up-and-down pivotal movement of the arm 20. The hinge pin 12 is received by the slot 18 of the hinge block 11 in the same manner as in the first embodiment. The hinge block is modified however to accommodate vertical pivotal movement of the spring cylinder 21. To this end, the second slot segment 22 is provided with tapered faces 29 providing adequate clearance for vertical pivotal movement thereof. The angle of the tapered faces 29 determines the maximum angle A (FIG. 9) of vertical pivotal movement from the horizontal position. As can be seen in FIG. 9, pivotal movement in the horizontal plane as indicated by arrows B is also allowed by means common with the first embodiment.

Another minor variation in the second embodiment is in the provision of a pair of connection pins 19a and 19b rather than a single connection tab 19. Yet another minor variation is in the provision of a second washer 30 at the opposite end of the spring 14.

It should be appreciated that modifications and alterations obvious to those skilled in the art are not to be considered as beyond the scope of the present invention. For example, rather than being essentially rectilinear in form as depicted, the hinge block might have rounded edges rather than sharp corners to thereby provide an increased degree of smoothness to the pivoting action. Also, in metal eyeglasses, the "reinforcing arm" would simply constitute an exposed metal arm thereof.

The invention claimed is:

1. A hinge for eyeglasses, comprising:
   a hinge block for attachment to or formed integrally with a first part of the eyeglasses, the hinge block comprising a hinge block aperture and a slot extending from the hinge block aperture,
   a hinge pin attached to a second part of the eyeglasses, the hinge pin having a first axis and being receivable in the hinge block aperture so as to pivot about said first axis and having a leg extending radially therefrom, the leg being sized and shaped to pass within the slot upon said attachment and detachment, the hinge pin further comprising a transverse hole, the leg also comprising a transverse hole aligned with the transverse hole of the hinge pin, the hinge further comprising a transverse pin extending through the aligned transverse holes to allow pivotal movement of the leg with respect to the hinge pin about a second access normal to said first axis.

2. The hinge of claim 1, wherein the slot comprises a first segment extending parallel to the hinge block aperture and through which the leg passes during attachment to and detachment of the hinge pin to the hinge block, and a second segment extending normal to the hinge block aperture and within which the leg pivots in use.

3. The hinge of claim 2, wherein the second segment of the hinge block slot comprises tapered surfaces against which the leg can bear to define the maximum pivotal extent of the arm with respect to the hinge block.

4. The hinge of claim 1, wherein the hinge block further comprises a connection tab extending therefrom and by which the hinge block can be attached to the first part of the eyeglasses.

5. The hinge of claim 1, wherein the leg comprises a spring post having a coil spring located thereabout and wherein the second part of the eyeglasses comprises an elongate arm having a spring cylinder therein for receiving the spring post and the spring.

6. The hinge of claim 5, further comprising a washer attaching one end of the coil spring to the leg, and wherein the other end of the spring is attached to the elongate arm.

7. The hinge of claim 6, wherein the hinge block comprises a bearing face at least partially across which the second segment of the slot extends and wherein the spring cylinder comprises a buffer plate which bears against the bearing face under action of the coil spring.

8. The hinge of claim 7, wherein the bearing face and buffer plate are substantially flat.

9. Eyeglasses comprising the hinge of claim 1, wherein a lens and/or lens frame of the eyeglasses constitute said first part and wherein an arm of the eyeglasses constitute said second part.

* * * * *